Patented Jan. 2, 1934

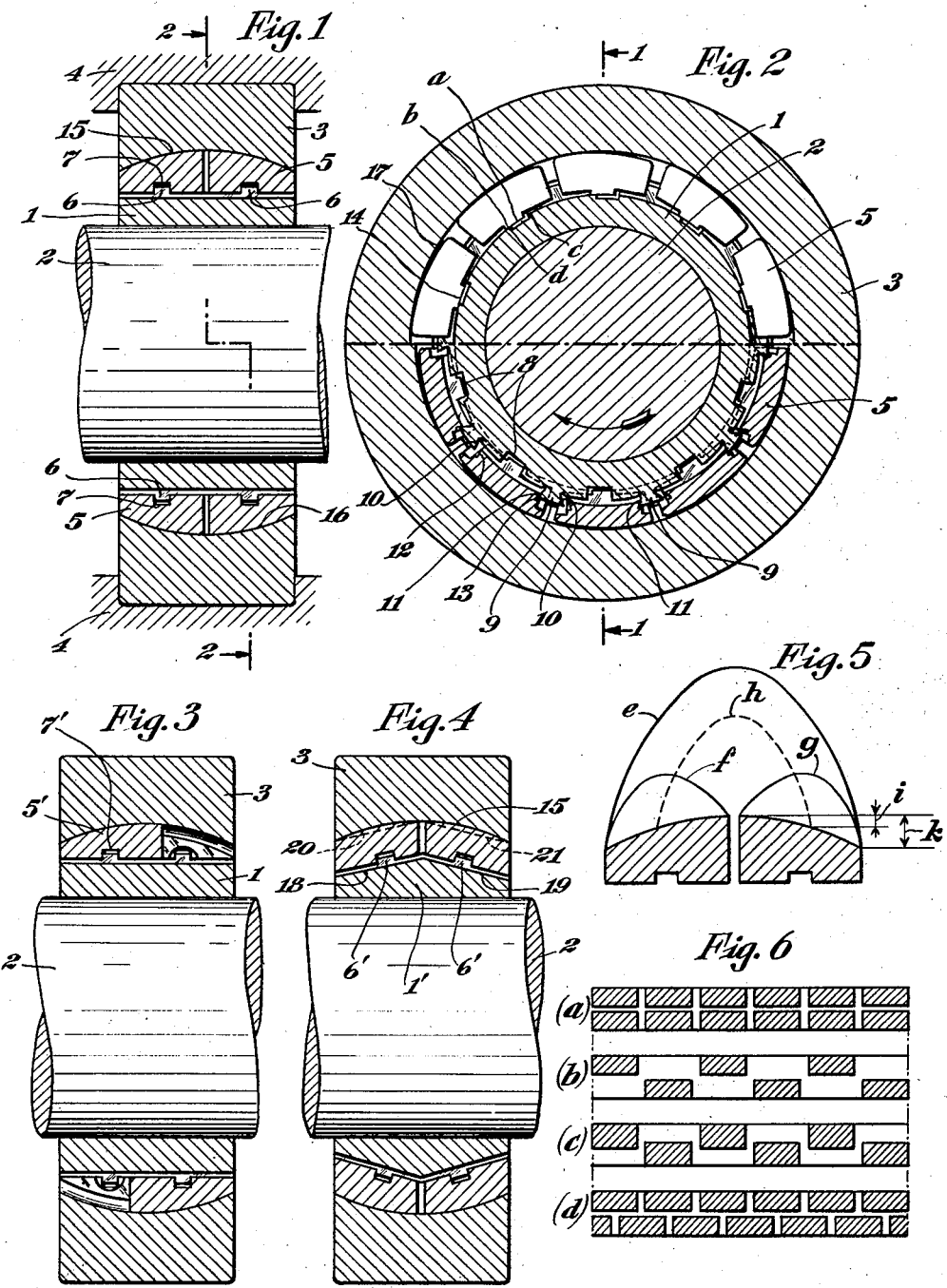

1,942,194

UNITED STATES PATENT OFFICE 1,942,194

BEARING

August Gunnar Ferdinand Wallgren, Stockholm, Sweden, assignor to Aktiebolaget Nomy, Stockholm, Sweden, a corporation of Sweden Application April 16, 1931, Serial No. 530,563, and in Sweden April 22, 1930

8 Claims. (Cl. 308—36)

The present invention relates to bearings of the sliding block type in which load sustaining films of lubricant are formed between the blocks and one of the bearing members with respect to which the blocks are supported in sliding relation.

The particular object of the invention is to provide an improved form of bearing of the above type which is adapted to sustain axial thrust loads as well as radial loads. The manner in which this object is accomplished and the more specific nature and objects of the invention will appear more fully in conjunction with the ensuing description of the several forms of apparatus for carrying the invention into effect which are illustrated in the accompanying drawing forming a part of this specification.

In the drawing, Fig. 1 is an axial cross-sectional view taken on the line 1—1 of Fig. 2, showing a bearing embodying the invention;

Fig. 2 is a transverse cross-sectional view taken on the line 2—2 of Fig. 1; and Figs. 3 and 4 show alternative constructions.

Figs. 5 and 6 illustrate bearing pressures and arrangements.

In my copending application Serial No. 277,769 filed May 14, 1928, Pat. No. 1,871,485, granted Aug. 16, 1932, I have disclosed a bearing of the general type above referred to, in which a row of bearing blocks arranged radially between bearing members is caused to rotate with one of the members and to slide in tilted position with respect to the other of said members.

The sliding bearing surfaces of the blocks and of the member with respect to which they slide are spherically curved, and due to the curvature of these surfaces the bearing is capable of sustaining a certain amount of axial thrust. However, in such a bearing the relation of the radial load and the axial thrust load capacities of the bearing is such that if the bearing is used for a shaft of large diameter which does not bear an excessive radial load, the bearing having sufficient capacity to sustain radial load will not have material axial thrust sustaining capacity. This is due to the fact that sufficient radial load sustaining capacity can be obtained in a large diametered bearing with a bearing which is very narrow axially, and when the bearing is narrow axially the radial component or extent of the spherically curved bearing surface is very small and consequently the load sustaining capacity of this surface in axial direction is small. If a bearing of large diameter is employed which is sufficiently wide to provide the necessary radial extent of sliding bearing surface the width of the bearing will be much in excess of that which is required, except in cases of abnormal radial loads, and this excess bearing width operates to increase materially the area of sliding bearing surface and consequently to increase materially the friction loss in the bearing. In accordance with the present invention the axial thrust capacity of bearings of the above type is increased as compared with the radial load capacity by providing a plurality of axially offset rows of bearing blocks and disposing such blocks in one or another of several different ways depending upon the specific load conditions, as will hereinafter more fully appear.

Turning now to Figs. 1 and 2 of the drawing, the bearing illustrated comprises an inner bearing member 1 mounted on shaft 2, and an outer bearing member 3 radially spaced from member 1. Member 3 is adapted to be mounted in any suitable housing or bearing support indicated generally at 4. In the embodiment illustrated, members 1 and 3 are in the form of separate bearing rings forming a part of a bearing unit, but it will be evident that the inner member 1, instead of being a separate ring, may be a part of shaft 2, and the outer bearing member 3, instead of being a separate ring, may be formed directly as a part of the housing or support 4.

A plurality of rows of bearing blocks 5 are located radially between the rings 1 and 3. In the present embodiment two rows have been shown and the blocks in the two rows are symmetrical with respect to the central transverse plane of the bearing. A description of the blocks in one row will therefore serve to illustrate the construction of all of the bearing blocks.

The inner bearing member is provided with a peripherally extending projection 6, and the inner faces of the blocks 5 are peripherally grooved as at 7 to receive the projection 6. As will be evident from Fig. 1 the projection 6 and grooves 7 provide cooperating axially extending surfaces operating to prevent axial displacement of the blocks with respect to the bearing member. Projection 6 is interrupted at symmetrically spaced intervals by axially extending notches or recesses 8, and intermediate each two adjacent recesses 8 the projection 6 is extended as at 9 to provide a plurality of abutment surfaces 10 and 11. The bearing blocks 5 are located between adjacent facing abutment surfaces 10 and 11, and each block is provided with abutment surfaces 12 and 13 adapted to cooperate respectively with surfaces 10 and 11.

As will appear from Fig. 2 the peripheral distance between the abutment surfaces 12 and 13 is less than the distance between adjacent surfaces 10 and 11, so that the blocks have a limited amount of peripheral movement with respect to the inner bearing member.

Axially to each side of the grooves 7 the blocks are provided with inwardly extending projections 14, the edges of these projections providing bearing surfaces $a$ and $b$ adapted to cooperate respectively with bearing surfaces $c$ and $d$ formed at the edges of the axial recesses 8.

The outer bearing member 3 is formed with a concave inner bearing surface 15 having radial extent. This surface is preferably of the form illustrated, that is, a spherically curved surface. The bearing blocks have complementary cooperating bearing surfaces 16 adapted to slide with respect to surfaces 15.

The operation of the bearing is as follows:

If the shaft 2 is rotated in the direction of the arrow in Fig. 2 the blocks are rotated therewith due to the contact of abutment surfaces 11 and 13, the blocks assuming the peripheral position shown in Fig. 2. With the blocks in this position bearing surfaces $b$ and $d$ are in contact, and surface $a$ is in a position such that it can enter the recess 8.

Upon rotation the eccentric loading of the bearing blocks cause them to tend to tilt to form a wedge-shaped space between the surfaces 15 and 16. This space has been indicated in exaggerated form at 17 in Fig. 2. A wedge-shaped oil film is formed between the blocks and the outer bearing member in the space 17, this oil film operating as a load sustaining medium between the relatively sliding surfaces.

If the shaft 2 is turned in the direction opposite that indicated in Fig. 2 the bearing blocks will shift peripherally with respect to the inner bearing ring, so that the abutment surfaces 10 and 12 of the bearing surfaces $a$ and $c$ are in contact, the bearing surface $b$ of each block being in position to move inwardly into its adjacent recess 8. Under these conditions the blocks tilt in a direction opposite that indicated in the figure and the load sustaining oil films are formed between the blocks and the outer bearing member in the same manner as above described.

For a more detailed exposition of the operation of this type of bearing reference may be had to my previously mentioned copending application Serial No. 277,769.

In the above described bearing the construction is preferably such that the notches or recesses 8 and the extensions 9 in each of the projections 6 are in axial alignment, so that the bearing blocks 5 in the two adjacent rows operate in axial alignment.

The bearing illustrated in Fig. 1 provides an arrangement of blocks illustrated diagrammatically in Fig. 6 ($a$), and from an inspection of these figures it will be evident that such a bearing is capable of sustaining both radial and axial loads of relatively great value. The axial extent of the bearing is such that the radial component or extent of surfaces 15 provides means for taking up considerable axial thrust, while the large bearing surface provided by the two rows of blocks is sufficient to support large radial loads.

If the shaft 2 is subjected to axial thrust to the right in Fig. 1, this thrust will be transmitted from the inner bearing member to the right hand row of blocks 5 through the medium of the side surfaces of the projections 6 and grooves 7 in the right-hand row of blocks, and from the right-hand row of blocks it will be transmitted to the outer bearing member through the cooperating bearing surfaces provided by the outer faces 16 of the right-hand row of blocks and the right-hand half of surface 15. With the thrust in this direction the left-hand row of blocks are not subjected to thrust load. If the direction of thrust is reversed the left-hand row of blocks absorbs the thrust load and the right-hand row of blocks is not loaded in axial direction.

If in a bearing such as that shown in Fig. 1 the thrust is always in one direction, for example, to the right, and in the particular application of the bearing the radial load does not require all of the blocks, a number of the blocks in the left-hand row may be removed, thereby decreasing the friction loss in the bearing without impairing its load sustaining ability for the conditions imposed. If the direction of the axial thrust changes and this thrust is of small enough value so that less than the full right-hand row of blocks will sustain the thrust load, alternate blocks in each row may be removed to reduce the friction loss provided the radial load is of small enough value so that half of the number of blocks shown in Fig. 6($a$) will sustain this load. Under such conditions, when blocks are removed from each row, it is preferable to so remove the blocks that the remaining blocks are in peripherally staggered relation as shown in Fig. 6($b$). If the value of the radial load does not permit the removal of alternate blocks in each row as shown in Fig. 6($b$) a modified form of bearing may be employed in which the arrangement is as shown in Fig. 3 and Fig. 6($c$). In this arrangement the same inner and outer bearing ring construction may be employed as is used in the bearing shown in Fig. 1, the difference in construction being that the bearing blocks 5' are provided with peripheral grooves 7' offset with respect to the axial centers of the blocks so that the blocks extend from one edge of the bearing inwardly past the axial center of the bearing to provide additional bearing surface for sustaining radial load. It will be apparent that this change may readily be made without necessitating any change in the inner and outer bearing rings, if these rings are constructed as noted above, with the extensions 9 and recesses 8 on the inner member placed in axial alignment. Such construction is of material advantage in that it permits the use of bearing rings of standardized construction in the manufacture of bearings having widely differing load carrying capacities, the different load carrying capacities being dependent merely upon the arrangement and form of the bearing blocks. In some instances it may be of advantage to stagger the blocks of adjacent rows peripherally, as illustrated diagrammatically in Fig. 6($d$). When this arrangement is used variations in the block arrangement such as that shown in Fig. 6($b$) may be employed, but obviously with the ring construction necessary for the block arrangement shown in Fig. 6($d$) the axially overlapping arrangement of blocks shown in Fig. 6($c$) is impractical.

In Fig. 4 still another form of bearing is illustrated which differs from the previously described forms in that the inner bearing ring 1' is in the form of a double cone having outer conical surfaces 18 and 19, which are substantially parallel respectively to the lines 20 and 21, which lines represent chords of the portions of the spherical surfaces 15 cooperating with the two rows of bearing blocks. By reason of the fact that the surface 18, and consequently the bearing surfaces $c$ and $d$ carried thereby, is parallel to the chord 20 and the surface 19 with its bearing surfaces $c$ and $d$ is parallel to the chord 21, the bearing blocks may be made of a more uniform thickness axially of the blocks than in the form of construction illustrated in Fig. 1, and due to the more symmetrical loading of the blocks these blocks may be made thinner than can the blocks of the type shown in Fig. 1, without involving the danger of so weakening the blocks that they might be sprung out of shape under load.

In order to balance the forces arising in the blocks when the bearing is in operation and to counteract any tendency of the blocks to assume an oblique position axially, the projections 6' are, in the present form of device, placed somewhat nearer the inner edges of the blocks than the outer edges thereof. It is to be noted that in this form of the device the bearing surfaces $c$ and $d$, upon which the blocks tilt, are more nearly parallel to the surface 15 than in the form of construction illustrated in Fig. 1. This parallel arrangement of the surfaces is of advantage in the operation of the device in that it is of assistance in causing the blocks to tilt in the desired manner with respect to the spherical bearing surfaces to produce the necessary load sustaining films of lubricant.

In Fig. 5, various curves are given, illustrating the relative bearing pressures obtaining in different types of bearings. Curve $e$ illustrates the pressures obtaining in the oil film in a bearing comprising a single row of blocks, while curves $f$ and $g$ represent the pressures obtaining in the oil film in a bearing of the same size in which two rows of blocks are employed. From these curves the characteristics of the pressures produced in the oil films will be evident, and it will further be noted that the capacity of the bearing to sustain radial loads varies with the width of the bearing.

Curve $h$ shows in dotted lines the pressure curve corresponding to the width of blocks which would be necessary to sustain radial load of the same value as can be sustained when two rows of blocks are used. If the bearing were formed with but a single row of blocks of this width a radial extension $i$ of the spherically curved sliding surface would be obtained, which radial extension is so small that the bearing would not have any material axial load sustaining capacity, while if the bearing is formed with two rows of blocks, in accordance with the present invention, a much greater radial extension of the curve represented by $k$ is obtained, which obviously greatly increases the axial load sustaining capacity of the bearing.

The number and form of the blocks in a bearing of given size may obviously be materially altered without departing from the scope of the invention, for example, the individual blocks, instead of being of oblong form as herein illustrated, may be substantially square. Other modifications also may be employed, such, for instance, as bearings in which the surface 15 of the outer member is in the form of a double cone as indicated at 21 in Fig. 4, the outer surface of the blocks being cylindrical rather than spherically curved. Such a form of double conical bearing is of advantage in that it increases the tendency of the lubricant to flow under the influence of centrifugal force to the axially central portion of the bearing, from which portion of the bearing it enters the spaces between the bearing blocks and the outer bearing member.

The invention is also applicable in bearings in which the blocks are tiltably mounted on the relatively stationary bearing member.

Furthermore, the type of bearing herein described may be combined with circular elements situated between the bearing members and adapted to sustain the bearing load under static and starting conditions. Such construction provides a bearing particularly suitable for use on axles of railway rolling stock or the like, and is described and claimed in my copending application Serial No. 530,181, filed April 15, 1931.

From the foregoing description it will be apparent that many changes and modifications in the forms of bearing given herein by way of example may be made without departing from the scope of the invention as defined by the appended claims.

What I claim is:

1. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, the major portion of the bearing surfaces on the blocks in one of said rows being positioned obliquely to the axis of rotation in one sense to resist axial thrust on the bearing in one direction and the major portion of the bearing surfaces on the blocks in the other of said rows being positioned obliquely to the axis of rotation in opposite sense to resist axial thrust on the bearing in the opposite direction.

2. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, the major portion of the bearing surfaces on the blocks in one of said rows sloping in one direction axially of the bearing and the major portion of the bearing surfaces on the blocks in the other of said rows sloping in the opposite direction axially of the bearing.

3. A combined axial thrust and radial bearing comprising radially spaced inner and outer bearing members and two axially offset rows of tiltably mounted bearing blocks having operative positions radially between said members, one of the said members having a spherically curved bearing surface and said blocks having bearing surfaces adapted to slide relative to said spherically curved bearing surface and cooperating therewith on rotation to form wedge-shaped spaces for load sustaining oil films, the major portion of the bearing surfaces on the blocks in one of said rows cooperating with the portion of said spherically curved surface axially to one side of the greatest diameter of the spherically curved surface and the major portion of the bearing surfaces on the blocks in the other of said rows cooperating with the portion of said spherically curved surface axially to the opposite side of the greatest diameter of the spherically curved surface.

4. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, the major portion of the bearing surfaces on the blocks in one of said rows being positioned to resist axial thrust on the bearing in one direction, the major portion of the bearing surfaces on the blocks in the other of said rows being positioned to resist axial thrust on the bearing in the opposite direction and the blocks in each of said rows being staggered peripherally with respect to adjacent blocks in the other of said rows.

5. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, the major portion of the bearing surfaces on the blocks in one of said rows being positioned to resist axial thrust on the bearing in one direction, the major portion of the bearing surfaces on the blocks in the other of said rows being positioned to resist axial thrust on the bearing in the opposite direction, the blocks in each of said rows being spaced peripherally from adjacent blocks in the same row a distance greater than the peripheral length of the blocks and the blocks in each of said rows being staggered peripherally with respect to adjacent blocks in the other of said rows.

6. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, the major portion of the bearing surfaces on the blocks in one of said rows being positioned to resist axial thrust on the bearing in one direction, the major portion of the bearing surfaces on the blocks in the other of said rows being positioned to resist axial thrust on the bearing in the opposite direction, the blocks in each of said rows being spaced peripherially from adjacent blocks in the same row a distance greater than the peripheral length of the blocks, the blocks in each of said rows being staggered peripherally with respect to adjacent blocks in the other of said rows and the blocks in each of said rows having bearing surfaces extending axially into the spaces between adjacent blocks of the other row.

7. A combined axial thrust and radial bearing comprising radially spaced inner and outer bearing members and two axially offset rows of tiltably mounted bearing blocks having operative positions radially between said members, one of said members and said blocks having bearing surfaces cooperating on rotation to form therebetween wedge-shaped spaces for load sustaining oil films, and the blocks in said rows being thicker radially at their axially adjacent sides than at their axially remote sides.

8. A combined axial thrust and radial bearing comprising radially spaced inner and outer bearing members and two rows of axially offset bearing blocks having operative positions radially between said members, said inner member and each of said rows of blocks having cooperating surfaces for causing the blocks to tilt on rotation, the cooperating surfaces in one row being conical and sloping in one direction axially of the bearing and the cooperating surfaces in the other row being conical and sloping in the opposite direction axially of the bearing, said outer member and said blocks having spherically curved bearing surfaces cooperating on rotation and tilting of the blocks to form wedge-shaped spaces for load sustaining oil films, the major portion of the bearing surfaces on the blocks in one of said rows cooperating with the portion of the spherically curved bearing surface on said outer member axially to one side of the greatest diameter thereof and the major portion of the bearing surfaces of the blocks in the other of said rows cooperating with the portion of the spherically curved bearing surface of said outer member axially to the opposite side of the greatest diameter thereof.

AUGUST GUNNAR
FERDINAND WALLGREN.